N. H. NELSON.
TRACTION ENGINE.
APPLICATION FILED NOV. 6, 1911.

1,061,684.

Patented May 13, 1913.
3 SHEETS—SHEET 1.

WITNESSES.
W. E. Naylor
J. Jessen

INVENTOR
NELS. H. NELSON
BY
Paul
ATTORNEYS.

N. H. NELSON.
TRACTION ENGINE.
APPLICATION FILED NOV. 6, 1911.

1,061,684.

Patented May 13, 1913.

3 SHEETS—SHEET 3.

WITNESSES

INVENTOR
NELS. H. NELSON.
BY Paul & Paul
ATTORNEYS.

UNITED STATES PATENT OFFICE.

NELS H. NELSON, OF WILLMAR, MINNESOTA.

TRACTION-ENGINE.

1,061,684.   Specification of Letters Patent.   Patented May 13, 1913.

Application filed November 8, 1911. Serial No. 658,766.

*To all whom it may concern:*

Be it known that I, NELS H. NELSON, a citizen of the United States, of Willmar, Kandiyohi county, Minnesota, have invented certain new and useful Improvements in Traction-Engines, of which the following is a specification.

The object of the invention is to provide a traction engine adapted for use for all kinds of farm work and a further and particular object is to provide a traction engine which may be used for drawing a cultivator through a field of corn, the machine straddling one or more rows without danger of breaking the corn stalks.

A further object of the invention is to provide a traction engine which will readily adapt itself to an uneven surface without racking or twisting the frame of the machine or the operating mechanism thereof, and a still further object is to provide a comparatively light machine and one which will be strong and durable and of sufficient power for all kinds of work on the farm.

My invention consists generally in various constructions and combinations, all as hereinafter described and particularly pointed out in the claims.

Figure 1:
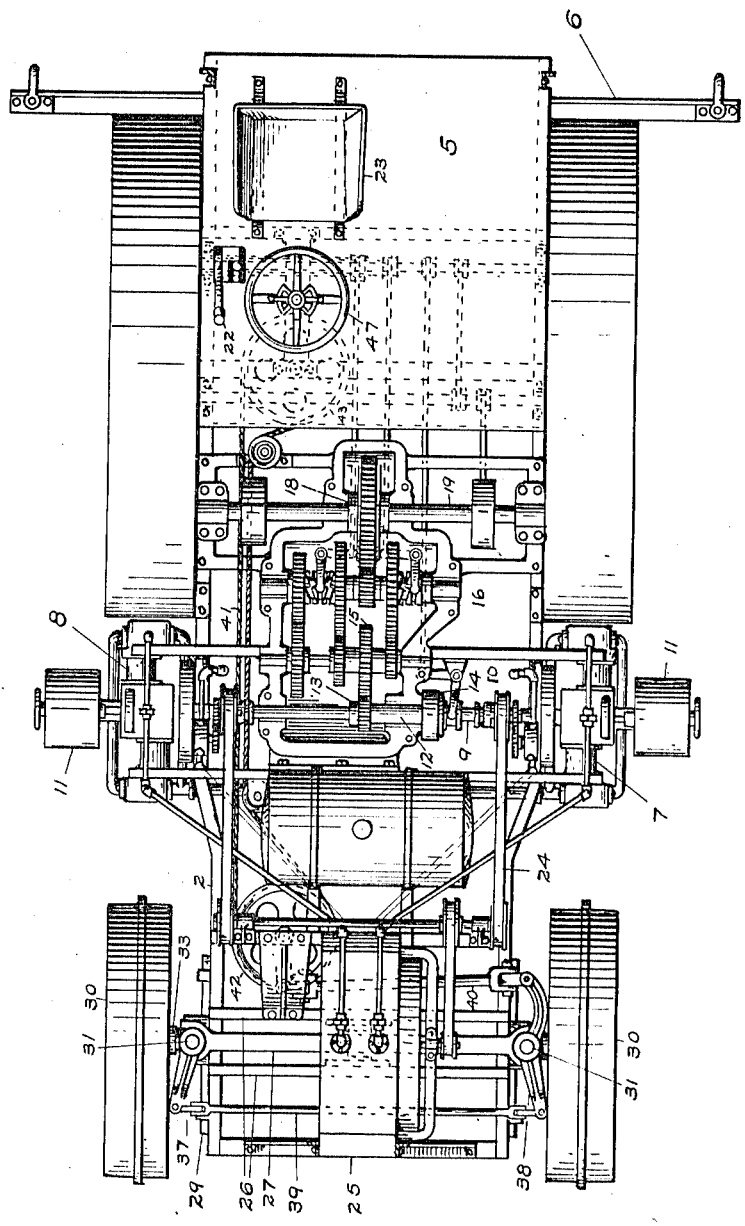
Figure 2:
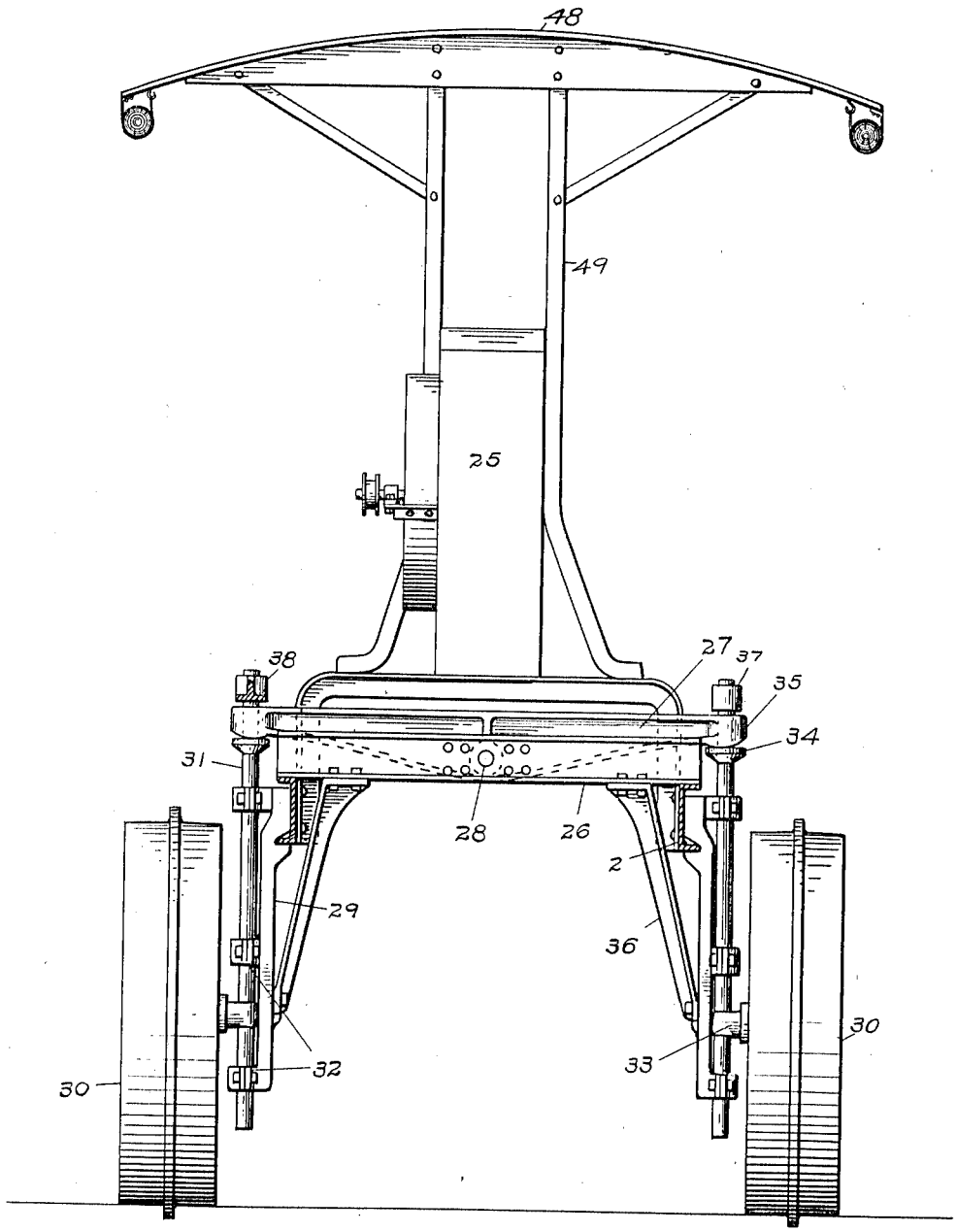
Figure 4:
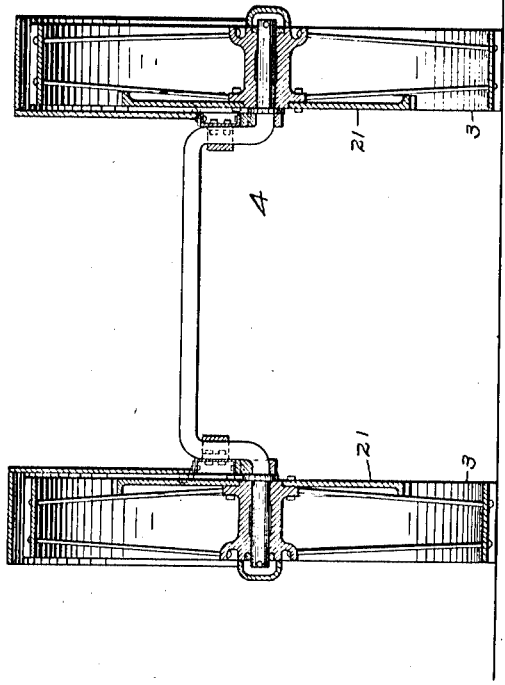
Figure 3:
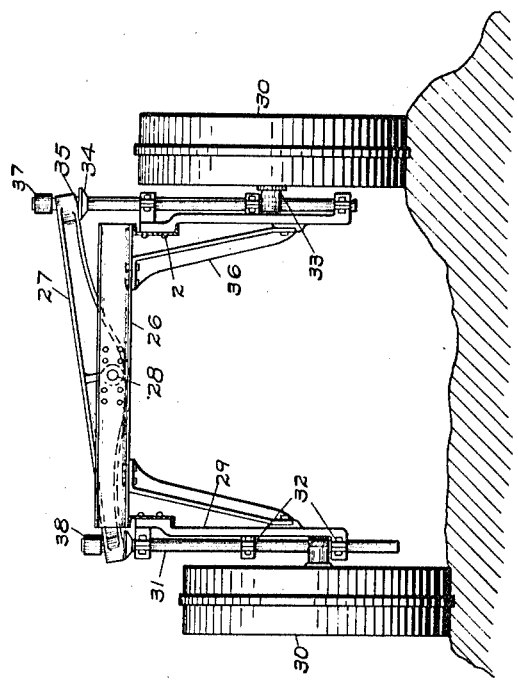

In the accompanying drawings forming part of this specification, Figure 1 is a plan view of a traction engine embodying my invention, the transmission gearing casing being removed to show the position of the gears therein, Fig. 2 is a transverse sectional view of the engine. Fig. 3 is a detail view showing the equalizing bar and its connection with the wheels to adapt the machine for an uneven surface, Fig. 4 is a sectional view of the rear wheels.

In the drawing, 2 represents the frame of the machine, 3 the rear traction wheels mounted on an axle 4 having a raised or offset portion between the wheels and whereto the side bars of the frame are secured. 5 is a platform at the rear of the frame between the rear wheels and 6 a draft bar extending transversely of the machine and to which the agricultural implements are attached in the ordinary manner.

7 and 8 are engines located upon opposite sides of the longitudinal center of the machine, preferably directly in front of the rear traction wheels. A transverse shaft 9 is interposed between these engines and has clutch connections 10 therewith so that the shaft may be operated from either one or both of the engines. A pulley 11 is provided outside the engines on each side of the machine from which belts may be run to a separator or any other machine which it may be desired to operate on the farm. A sleeve 12 is splined on the shaft 9 and carries a pinion 13 and has a clutch 14. The pinion 13 is adapted to mesh with a gear 15 of the transmission gearing that is mounted in the gear casing 16. It being of ordinary construction, I will make no claim to the same herein except to state that the train of gears transmits power from the engine to a gear 18 mounted on a shaft 19 having driving connections, (not shown) with the rear traction wheels of the machine.

By means of the clutch 14 both engines may be operatively connected with the shaft 19 to drive the machine and by means of the clutches 10 either one or both of the engines may be utilized to drive the machine, or one engine may be used to drive the machine and the other one belted to a separator or other machine. The clutches are controlled by suitable levers 22 mounted at the rear of the machine near the driver's seat 23. I prefer also to connect the shaft 9 through the belts 24 with a cooling mechanism 25 disposed on the forward portion of the frame. This, however, forms no part of the subject-matter of my invention and detailed description is unnecessary.

Referring to Figs. 2 and 3, 26 represents cross bars connecting the side bars of the frame and 27 is an equalizing bar or rocker pivoted at 28 and adapted to rock vertically between the bars 26, as shown in Figs. 1 and 3. Hangers 29 are secured to the frame on each side and depend vertically to a point below the hubs of the forward wheels 30. Rods 31 are journaled in boxes 32 on these hangers and are adapted to slide vertically and rotate a limited distance therein. The forward wheel axles 33 are mounted on these rods, (see Fig. 2) and move up and down with the rods and swing with the rotation of the rods. The upper ends of the rods have collars 34 thereon upon which the rounded or curved under surface 35 of the ends of the equalizing bar 27 are adapted to rest, the equalizing bar having forked ends to straddle the upper ends of the rods. The lower portions of the hangers 29 are braced and strengthened by brackets 36 which are secured at their lower ends to the hangers and at their upper ends to the cross bar 26. It will be evident from an examination of Fig. 2 that the space between the forward wheels of the machine will be practically unobstructed and the equalizing bar normally near the ground line will be raised to such a distance from the ground that the frame of the machine and the equalizing bar supported thereby will readily pass over one or two rows of corn without danger of contacting with the stalks and breaking them. In case one of the wheels strikes an obstruction or an uneven place in the field, the rod connected therewith will slide vertically and allow the wheel to accommodate itself to the uneven surface without tilting the frame of the machine from its normal horizontal position. (See Fig. 3).

For the purpose of steering the machine I mount an arm 37 on the upper end of one of the rods 31 and a rocker 38 on the other arm and connect the arm 37 with one end of the rocker 38 by a pivoted rod 39. A link 40 connects the other arm of the rocker 38 with a cable 41 which passes around and is adjustably attached to wheels 42 and 43. One of these wheels is preferably located at the forward portion of the machine and the other at the rear portion, the rear wheel having a gear connection with a steering post located near the driver's seat 23 and having an operating wheel 47. By revolving, the cable 41 will be moved back and forth, rocking the arm 37 and the rocker 38 and swinging the forward wheels forward and backward to steer the machine. The axles of the forward wheels may be secured by suitable means to the rods 31 or they may be formed integrally therewith, as preferred. The machine is preferably covered by a suitable canopy 48 supported by standards 49.

In the operation of the machine, the driver will connect one or both of the engines with the driving shaft and apply the power to the rear traction wheels to move the machine across the field. The oppositely arranged engines will balance the frame of the machine, rendering it more stable and distributing the load more evenly between the wheels. At any time the engines may be disconnected from the driving shaft and one or both of them utilized for driving a belt or swinging up a cable or for any other work for which a machine of this kind might be utilized on a farm.

I claim as my invention:—

1. The combination, with a frame, having rear traction wheels and a source of motive power mounted on said frame, of an equalizing bar, rotating, vertically-sliding rods having loose connections with said bar, forward wheels having their axles secured to said rods and a steering mechanism attached to said rods for rotating them.

2. A machine of the class described, comprising a frame having rear traction wheels, a source of motive power mounted on said frame and operatively connected with said traction wheels, forward wheels for said frame, an equalizing bar pivotally supported above the level of said forward wheels, means connecting said equalizing bar with said wheels and having a rotary and vertical movement with said wheels, and a steering mechanism connected with said forward wheels.

3. A machine of the class described comprising a frame having rear traction wheels and a source of motive power mounted on said frame and operatively connected with said rear wheels, said frame being composed of side rails and cross bars between them, hangers depending from said side rails, rods having bearings in said hangers and having a rotary and vertical movement therein, forward wheels having axles secured to said rods, an equalizing bar pivoted in said frame and connected with said rods, and a steering mechanism connected with said rods.

4. A machine of the class described comprising a frame having forward and rear wheels, a source of motive power mounted on said frame and operatively connected with said rear wheels, a rear axle having a raised middle portion between said rear wheels, said frame having a raised or arched portion between said forward wheels, an equalizing bar pivoted in the arched portion of said frame, means operatively connecting said bar with said forward wheels, said means permitting the vertical movement of said wheels and the oscillation thereof to steer the machine, and a steering mechanism for said wheels.

5. A traction engine comprising a frame having forward and rear carrying wheels, a source of motive power operatively connected with said rear wheels, a centrally pivoted equalizing bar, and vertically movable means connecting the ends of said equalizing bar with said forward wheels.

6. A traction engine comprising a frame having forward and rear carrying wheels, a source of motive power mounted on said frame and operatively connected with said rear wheels, said forward wheels having an oscillating movement to guide the machine and a vertical sliding movement in said frame to allow said wheels to adapt themselves to an uneven surface without tilting said frame, a pivoted equalizing bar having its ends connected with said forward wheels, and a steering mechanism connected with said forward wheels.

7. The combination, with a frame having carrying wheels therefor and a source of power mounted on said frame, of an equalizing bar pivoted on said frame, vertically sliding rods having loose connections with the ends of said equalizing bar, the lower portions of said rods being connected to said forward wheels.

8. The combination, with a frame having carrying wheels and a source of motive power mounted on said frame, of a centrally pivoted equalizing bar having forked ends, rods vertically slidable in bearings in said frame and fitting loosely within the forks in the ends of said equalizing bar and having their lower portions connected with said forward wheels.

9. A machine of the class described comprising a frame having rear traction wheels and a source of motive power mounted on said frame, said frame being composed of side rails, hangers depending from said side rails, rods having bearings in said hangers and vertically slidable therein, forward wheels having axles secured to said rods, and an equalizing bar mounted on said frame and having its ends engaging said rods.

In witness whereof, I have hereunto set my hand this 3rd day of August, 1911.

NELS H. NELSON.

Witnesses:
R. W. STANFORD,
M. H. NELSON.